Figure 1:
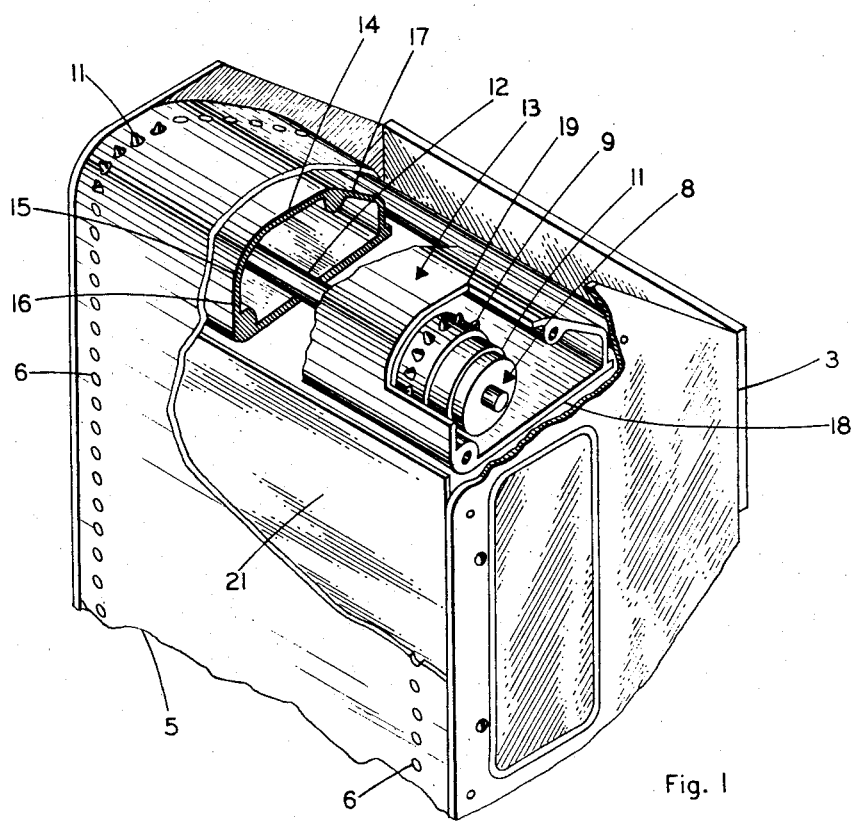

March 24, 1959   H. E. ALBRIGHT   2,879,128
STRIP CHART RECORDER
Filed Oct. 3, 1955

Inventor
Harry E. Albright
by, Richard E. Hosley
His Attorney

United States Patent Office 2,879,128
Patented Mar. 24, 1959

2,879,128

STRIP CHART RECORDER

Harry E. Albright, Marblehead, Mass., assignor to General Electric Company, a corporation of New York Application October 3, 1955, Serial No. 538,213

7 Claims. (Cl. 346—117)

This invention relates generally to improvements in strip chart recorders and more particularly to improvements in the chart marking or recording components thereof, whereby visibility and readability of the record produced on the chart is substantially enhanced.

In one common form of strip chart recorder that has been in widespread use, the chart marking device, usually in the form of a pen, swings laterally across the chart in an arcuate path to produce the chart record and the chart is guided downwardly along the front face of the recorder so that the chart record may be seen from the front of the instrument. Such charts usually have their outer edges perforated to cooperate with the sprocket-like ends of a suitably driven timing drum, whereby the drum can feed the chart through the recorder at a controlled rate. To insure smooth travel of the chart, such timing drums are usually in the form of a roller and are preferably mounted in proximity to the front face of the recorder, near the top thereof, and the strip chart is fed horizontally into the drum from within the recorder, after which it passes partially around the drum and downwardly along the front face of the recorder.

In such recorders, it has been found convenient to mount the recording pen so that it swings across the horizontally moving portion of the chart, but in order to provide a suitable writing surface under the chart as it passes under the pen, it has been necessary to move the point of recording away from the front face of the recorder to some interior position behind the timing drum where space is available to mount a marking platen utilized for the writing surface.

Thus, the strip chart comes from a suitable supply roll and first passes across the marking platen, after which it passes onto and around the timing drum, and thence downwardly across the front face of the recorder. Such recorders function well for the purpose intended but with the aforesaid arrangement of the various recording components, they have the disadvantage of having the foremost point of recording behind the timing drum and thus not readily or easily seen from the front of the instrument. Even with the timing drum in full view through the window usually provided in the front face of the recorder, the record trace is not readily visible until the chart starts its downward path over the timing drum, thereby introducing an undesirable time delay between the instant of recording and the instant of visibility of the record trace.

Moreover, since the indicating devices usually provided with such recorders comprise a fixed scale cooperating with an index mounted on the pen, the scale, of necessity, would be somewhat removed from the front of the instrument, adding further to the disadvantages inherent in the aforesaid arrangements.

It is thus a primary object of the present invention to provide improved marking arrangements for a strip chart recorder whereby the record trace produced on the chart is visible to an observer substantially at the instant of recording.

It is a further object of the invention to provide such improved recording arrangements for a strip chart recorder without adding to the complexity of such instruments or without detracting from the benefits and advantages inherent in certain time proven features of design forming a part of such recording arrangements.

Briefly, in one aspect thereof, the invention comprises moving the foremost point of recording in a strip chart recorder toward the front face of the instrument such that the major record on the chart is made directly above the axis of rotation of the timing drum relied upon to advance the chart through the instrument. The timing drum, instead of having a substantially uniform diameter throughout its length, is cut away intermediate of its chart engaging ends to accommodate a marking platen that underlies the chart in the area of recording. The marking platen has one portion thereof extending to the rear of the instrument to support and guide the chart as it passes onto the timing drum, and the platen also has another portion extending forwardly and away from the point of recording to support and guide the chart as it moves beyond the point of recording. The forward portion of the platen has an arcuate section to take the place of the portion cut away from the timing drum, thereby retaining the smooth travel of the strip chart through the recorder.

Figure 2:
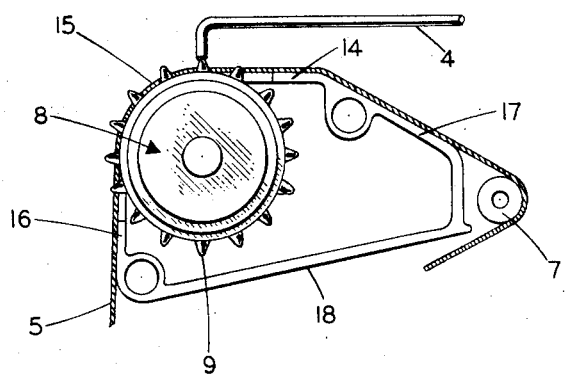

The objects of the invention, together with the benefits and advantages attendant thereto, will be more fully understood upon reference to the detailed description of the invention set forth below, particularly when taken in conjunction with the drawings annexed hereto, in which:

Figure 1 is a partial cutaway view, in perspective, of a strip chart recorder, illustrating the features of the present invention, and Figure 2 is a partial end view of the arrangement shown in Figure 1, including a portion of the chart marking device.

Referring first to Figure 1, there is shown a portion of a strip carriage assembly normally found in one type of strip chart recorder to which the subject invention applies and it is seen that this assembly includes a main supporting framework 3 on which the various recording components and their associated driving mechanisms are conveniently mounted. Usually, these chart carriage assemblies form a completely separate part of the complete recorder, being removable as desired for any necessary servicing, adjustment, or repair.

The chart carriage assembly in the illustrated embodiment normally extends vertically within the recorder and the chart marking device is adapted to swing across the top of this assembly and cooperate with a suitable strip chart to produce the desired record. A part of a chart marking device is shown in Figure 2 comprising a conventional recording pen 4 which may be connected in the known manner to a suitable instrument mechanism responding to the condition being recorded.

Cooperating with pen 4 is a strip chart 5 made of suitable recording paper and having its opposite edges perforated as at 6 and normally formed initially into a compact roll that may be conveniently installed within the chart carriage assembly on a conventional supply spool carried by the framework 3. The supply spool has not been shown in the drawings nor will it be further described in that such arrangements are conventional and well understood by those skilled in the art. Suffice it to say that the spool is suitably mounted for rotation whereby the free end of the strip chart can be taken from the spool and guided over suitable rollers also carried by the framework 3, one of which is indicated at 7 in Figure 2 from which the chart passes on to a timing drum 8.

The timing drum 8 is normally driven by a suitable clock mechanism, either electrical or mechanical, but since the drive mechanism may be of conventional design and forms no part of the subject invention, it has been omitted for the sake of clarity. The drum will drive the chart at a controlled rate through the recorder, there being suitable adjustments of driving speed within the limitations of the driving means and compatible with normal requirements of those using the recorder.

The timing drum has its opposite ends formed with a circumferentially arranged series of outwardly projecting pins 9 such that the outer ends are substantially in the form of sprockets adapted to engage the perforations of the chart and positively drive the chart through the recorder. The pins on each end of the drum 8 are carried by a hub assembly 11 and the hub assemblies are rigidly fixed by any suitable means to a shaft 12 extending therebetween and suitably journalled for rotation in the carriage frame 3. It is important to note that the diameter of the shaft 12 is much smaller than the diameter of the ends of the drum 8, and the drum has been cut away in this manner to accommodate a marking platen 13 also carried by the carriage frame 3 and extending between the outer ends of the drum 8.

In the illustrated embodiment, the marking platen 13 is a suitably shaped member having a substantially horizontal portion 14, a downwardly curving portion 15, a front vertical portion 16, a rear sloping portion 17 and a connecting bottom 18. A portion of the platen is cut away at 19 to accommodate the sprocket-like ends of the timing drum 8, and the arcuate portion 15 has a radius of curvature identical to the radius of the sprocket-like ends of the drum 8, so that the arcuate portion and the drum ends form a substantially continuous curved surface.

With the above arrangement of parts in mind, it is apparent that the strip chart comes from the supply roll, over the guiding roller 7 and then up the sloping surface 17 of the marking platen. The strip then passes on to the horizontal portion 14 where it is supported and guided onto the sprocket-like ends of the timing drum in a substantially horizontal direction and in a tangential manner. The point of substantial tangency is directly above the axis of rotation of the shaft 12 and it is here that the major area of recording is located, for it is seen in Figure 2 that the writing tip of the pen arm 4 is located directly above the axis of rotation of shaft 12 at the center of the chart; that is, at the center of the strip the foremost point of recording occurs where the chart forms an angle of approximately 90° with a radial line extending outwardly from the axis of rotation of the timing drum.

As the pen arm moves to the edges of the chart, the point of recording falls somewhat behind the foremost point of recording at the center of the chart because of the arcuate path travelled by the pen. However, since the majority of recording usually occurs in the central area of the chart, it is apparent that the majority of recording is accomplished generally at the foremost point of recording. Even at the edges, with a chart having an effective recording width of about 4½ inches, the radius of the pen arm has been deliberately elongated to reduce the rearward excursion of the point of recording to a maximum of less than ½ inch.

As the strip chart moves forward from the point of recording under the driving influence of the timing drum 8, it begins to move through a path that initially curves downwardly away from the point of recording and ultimately passes generally downwardly along the front face of the carriage assembly, which in the illustrated embodiment, includes the vertically mounted writing table 21.

It is important to note that the timing drum has been located as far forward as is possible in the chart carriage assembly and is also located at the upper extremity thereof. Such a location has been found to be most effective for insuring the smoothest travel of the chart through the recorder and with the foremost location of the writing tip of pin 4 directly above the axis of rotation of drum 8, the majority of recording is achieved while the chart is positively engaged by the drum, thereby minimizing any tendency of the instrument to record values of a condition under observation not closely and accurately correlated to the precise instant at which such values occur. In other words, slippage of the strip chart at the point of recording has been minimized.

By cutting away the timing drum intermediate its sprocket-like ends, and locating the marking platen at this cutaway area, it is thus possible to improve the inherent accuracy of the recorder while at the same time enhancing the readability and visibility of the record produced. Once the record has been made on the chart, it is immediately visible to anyone observing the action of the recorder.

Since the horizontal portion of the marking platen extends along the axis of the drum throughout the path of the pen, it provides the necessary supporting surface for the chart as it moves underneath the recording pen and also serves to guide the chart in its path through the recorder.

Without the timing drum cut away to provide for the location of the platen intermediate its ends, it would be necessary to move the foremost point of recording behind the drum somewhere within the recorder if the advantageous location of the timing drum were to be retained. By so moving the point of recording, the visibility of the record would be impaired in that there would be a delay between the point of recording and the instant when the record so made could first be observed. Such a location has the added disadvantage of moving any indicator scale associated with the moving pen further away from the front face of the recorder, thereby making it less accessible for easy readability and visibility.

Assuming that the point of recording were moved forward with respect to the timing drum, i.e., locating the marking platen in front of the drum, as has been done in prior recorders, the visibility of such arrangements would be comparable to the visibility achieved with the subject invention, but not without a sacrifice in accuracy resulting from possible slippage or erratic motion of the chart at the point of recording.

By locating the foremost point of recording directly above the axis of rotation of the timing drum shaft, it is possible with the arrangement disclosed herein, to achieve maximum visibility while the chart is positively and firmly engaged by the timing drum, resulting in an overall performance heretofore not possible with prior recorders.

In the aforesaid embodiment of the invention, it has been described in connection with a horizontally oriented timing drum, but it is to be understood that the invention would have equal application to a strip chart recorder having other orientations of its timing drum, viz., vertical orientation.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. In a strip chart recorder, the combination of a record chart in strip form, a movably mounted chart marking device, rotatably mounted means for advancing said strip relative to said marking device, said marking device being adapted to move generally above and spaced from the axis of rotation of said strip advancing means and to contact the central portion of said strip at a point along a radial line extending outwardly from said axis of rotation and forming an angle of approximately 90° with said strip, means for guiding said strip onto said strip advancing means along a plane beneath said marking device, and a marking platen underlying said strip having a portion thereof extending above the axis of rotation of said strip advancing means and intersecting said radial line, said strip advancing means having a portion thereof cut away to accommodate said portion of said platen.

2. In a strip chart recorder, the combination of a record chart in strip form, a movably mounted chart marking device, rotatably mounted means having its opposite ends adapted to engage the outer edges of said strip for advancing said strip relative to said marking device, said marking device being adapted to move generally above the axis of rotation of said strip advancing means and to contact the central portion of said strip at a point along a radial line extending outwardly from said axis of rotation and forming an angle of approximately 90° with said strip, means for guiding said strip onto said strip advancing means along a plane beneath said marking device, and a marking platen underlying said strip having a portion thereof between said strip outer edges and extending above the axis of rotation of said strip advancing means and intersecting said radial line, said strip advancing means being cut away intermediate of its strip engaging ends to accommodate said portion of said platen.

3. In a strip chart recorder, the combination of a record chart in strip form, a chart marking device movable in a horizontal plane, a rotatably mounted timing drum for advancing said strip relative to said marking device, said marking device being adapted to contact the central portion of said strip at a point substantially directly above the axis of rotation of said drum, means for guiding said strip tangentially onto said timing drum along a horizontal plane beneath said marking device, and a marking platen having a horizontally disposed portion thereof underlying said strip and extending transversely across said timing drum directly above said axis of rotation, said drum having a portion thereof cut away to accommodate said horizontal portion.

4. In a strip chart recorder, the combination of a record chart in strip form, a chart marking device movable in a substantially horizontal plane, a rotatably mounted timing drum for advancing said strip relative to said marking device, a portion of said drum between its outer ends having a diameter smaller than the diameter of said outer ends, said marking device being adapted to contact the central portion of said strip at a point substantially directly above the axis of rotation of said drum, means for guiding said strip substantially tangentially onto said timing drum along a substantially horizontal plane beneath said marking device, and a marking platen having a substantially horizontally disposed portion thereof underlying said strip directly above said axis of rotation and extending transversely across said portion of said drum having said smaller diameter.

5. In a strip chart recorder adapted for a vertical mounting position, the combination of a record chart in strip form, a chart marking device mounted adjacent the top of said recorder having a marking tip located in proximity to the front face of said recorder, said marking device moving in a horizontal plane, a rotatably mounted timing drum located in proximity to said marking tip and having its opposite ends adapted to engage the outer edges of said strip for advancing said strip relative to said marking tip, said marking tip being adapted to contact the central portion of said strip at a point directly above the axis of rotation of said drum whereby said record produced on said strip is visible from the front of said recorder substantially coincident to the recording thereof, means for guiding said strip onto said drum along a horizontal plane beneath said marking tip, and a marking platen having a horizontally disposed portion thereof underlying said strip at the point of marking thereof, said drum being cut away intermediate its ends to accommodate said portion of said platen.

6. The combination defined by claim 5 wherein means are provided for guiding said strip off of said drum along a plane extending downwardly along the front face of said recorder and said marking platen has another portion of arcuate configuration extending between said drum ends in said cutaway portion, said arcuate portion cooperating with said drum ends to form a substantially continuous supporting surface for said strip as it moves from said point of recording to said downwardly extending plane.

7. In a strip chart recorder, the combination of a record chart in strip form, a chart marking device having a marking tip adapted to move through an arcuate path, rotatably mounted chart engaging means for advancing said chart relative to said marking tip, said tip moving in a general direction above the axis of rotation of said chart engaging means and being adapted to contact said chart along said arcuate path, said point of contact being foremost along a radial line that extends outwardly from said axis of rotation and forms an angle of approximately 90° with said chart, means for guiding said chart onto said chart engaging means along a plane underlying said marking tip, and a marking platen having a portion thereof underlying said chart and extending thereunder throughout said arcuate path, said chart engaging means having a portion thereof cut away intermediate of its ends to accommodate said portion of said platen.

References Cited in the file of this patent

UNITED STATES PATENTS

| | | |
|---|---|---|
| 1,858,457 | Mottashed et al. | May 17, 1932 |
| 2,131,346 | Fairchild | Sept. 27, 1938 |

FOREIGN PATENTS

| | | |
|---|---|---|
| 238,037 | Germany | Mar. 25, 1911 |